US008923139B2

(12) United States Patent
Afzal et al.

(10) Patent No.: US 8,923,139 B2
(45) Date of Patent: Dec. 30, 2014

(54) SYSTEM AND METHOD FOR MAKING FAR END MEASUREMENTS FOR DSL DIAGNOSTICS

(75) Inventors: Muhammad Akbar Khan Afzal, Wexford, PA (US); Pieter Bas, Amsterdam (NL); Roderick Warner, Mapledurwell (GB)

(73) Assignee: Tollgrade Communications, Inc., Cheswick, PA (US)

( * ) Notice: Subject to any disclaimer, the term of this patent is extended or adjusted under 35 U.S.C. 154(b) by 718 days.

(21) Appl. No.: 12/668,354

(22) PCT Filed: Jul. 17, 2008

(86) PCT No.: PCT/US2008/070275
§ 371 (c)(1),
(2), (4) Date: Jun. 30, 2010

(87) PCT Pub. No.: WO2009/012358
PCT Pub. Date: Jan. 22, 2009

(65) Prior Publication Data
US 2010/0278050 A1 Nov. 4, 2010

Related U.S. Application Data

(60) Provisional application No. 60/959,817, filed on Jul. 17, 2007.

(51) Int. Cl.
*G01R 31/08* (2006.01)
(Continued)

(52) U.S. Cl.
CPC ........... *H04M 3/304* (2013.01); *H04L 12/2697* (2013.01); *H04L 12/2889* (2013.01); *H04L 43/50* (2013.01)
USPC ....... 370/247; 370/264; 379/9.06; 379/14.01; 379/15.01; 379/26.01; 379/27.03; 379/32.04

(58) Field of Classification Search
USPC ................ 370/242, 245, 247, 264; 379/9.06, 379/14.01, 10.01, 15.01, 22.03, 26.01, 379/27.03, 29.01, 32.01, 32.04
See application file for complete search history.

(56) References Cited

U.S. PATENT DOCUMENTS 6,058,162 A 5/2000 Nelson et al.
6,385,297 B2 5/2002 Faulkner et al.
(Continued)

FOREIGN PATENT DOCUMENTS

WO 0167729 A1 9/2001

OTHER PUBLICATIONS

Hank Hinrichs, "The Risk of Unwanted EMI Increases as Data Transfer Rates Increase and Circuit Size Compresses", (retrieved from Internet, URL: http://www.pulseeng.com/index.php?593), Mar. 2002, entire document.

*Primary Examiner* — Benjamin H Elliott, IV
(74) *Attorney, Agent, or Firm* — The Webb Law Firm

(57) ABSTRACT

A system is provided for identifying service affecting conditions in an access portion of a network through which a number of subscribers are connected to an exchange. The access network includes subscriber lines connected to DSL subscriber modems. The system includes a receiver for receiving pilot signals from a modem connected to one of the subscriber lines. A measuring unit is operatively associated with the receiver for measuring electrical characteristics of the received pilot signals. A controller is operatively associated with the measuring unit and uses the measured electrical characteristics to identify a service affecting condition. The subscriber modem pilot signals include differential mode signals and the measuring unit measures common mode of each wire of the subscriber line. By using combinations of measurements and deductive logic, the system can detect one or more service affecting conditions.

22 Claims, 3 Drawing Sheets

(51) Int. Cl.
  *G06F 11/00* (2006.01)
  *G08C 15/00* (2006.01)
  *H04J 1/16* (2006.01)
  *H04J 3/14* (2006.01)
  *H04L 1/00* (2006.01)
  *H04L 12/26* (2006.01)
  *H04M 1/24* (2006.01)
  *H04M 3/08* (2006.01)
  *H04M 3/22* (2006.01)
  *H04M 3/30* (2006.01)
  *H04L 12/28* (2006.01)

(56) References Cited

U.S. PATENT DOCUMENTS

| | | | |
|---|---|---|---|
| 6,389,109 B1 | 5/2002 | Schmidt et al. | |
| 6,459,733 B1 | 10/2002 | Yokoyama et al. | |
| 6,487,276 B1 | 11/2002 | Rosen et al. | |
| 6,687,336 B1 | 2/2004 | Holeys | |
| 6,741,676 B2 | 5/2004 | Rudinsky et al. | |
| 6,826,258 B2 | 11/2004 | Afzal | |
| 6,894,504 B2 | 5/2005 | Faulkner | |
| 6,895,081 B1 | 5/2005 | Schmidt et al. | |
| 6,901,137 B2 | 5/2005 | Rosen et al. | |
| 6,914,961 B2 | 7/2005 | Holeva | |
| 6,985,444 B1 | 1/2006 | Rosen | |
| 7,012,991 B1 | 3/2006 | Faulkner | |
| 7,042,983 B2 | 5/2006 | Bauer et al. | |
| 7,208,684 B2 | 4/2007 | Fetterolf, Sr. et al. | |
| 2002/0008525 A1* | 1/2002 | Seagraves et al. | 324/500 |
| 2004/0093370 A1* | 5/2004 | Blair et al. | 709/200 |
| 2004/0114527 A1 | 6/2004 | Faulkner et al. | |
| 2005/0069029 A1* | 3/2005 | Afzal | 375/222 |
| 2005/0094785 A1 | 5/2005 | Faulkner | |
| 2005/0135566 A1 | 6/2005 | Schmidt et al. | |
| 2005/0135567 A1 | 6/2005 | Faulkner | |
| 2005/0144272 A1 | 6/2005 | Herzberg | |
| 2006/0072708 A1 | 4/2006 | Warner et al. | |
| 2006/0251221 A1* | 11/2006 | Rosenberg | 379/22.01 |
| 2008/0012658 A1* | 1/2008 | Fortier | 333/12 |
| 2008/0095188 A1* | 4/2008 | Remy et al. | 370/468 |
| 2010/0278050 A1* | 11/2010 | Afzal et al. | 370/242 |

\* cited by examiner

SYSTEM AND METHOD FOR MAKING FAR END MEASUREMENTS FOR DSL DIAGNOSTICS

FIELD OF THE INVENTION

This application relates generally to broadband networks and, more particularly, to identifying faults in a network.

BACKGROUND OF THE INVENTION

With the recent growth in the use of the Internet and expansion of small and home offices, there has been a great demand for high speed data services at numerous premises. Many phone companies have responded to this demand by offering DSL (Digital Subscriber Line) services over their existing telephone lines. Another popular broadband network uses the cable TV (Television) network.

DSL services allow information to be transmitted over the phone line in digital form. With the digital encoding used in a DSL system, the number of bits that can be transmitted through a phone line is much greater than with a traditional analog modem.

One form of DSL service is an Asymmetric DSL (ADSL) service. With ADSL service, the downstream data flow rate is greater than upstream data flow rate. Conventionally, for ADSL1, the band from 25.875 kHz to 138 kHz is used for upstream communications, while the band from 138 kHz to 1104 kHz is used for downstream communication. Other forms of DSL networks include ADSL2, ADSL2plus, VDSL1 and VDSL2, generically xDSL, which typically operate at different frequency bands.

In these broadband networks, individual subscribers are generally connected to the network through the telephone access network. In an ADSL network, the access network is usually physically implemented on twisted pair copper wires originally deployed for narrowband voice telephony. These wires are routed from a central office in cable bundles that each runs through a neighborhood or other portion of the service area for the network. Wires are branched from the cable to make connection to individual homes or offices in the service area. A device at the central office is connected to the rest of the broadband network and can route signals from the network onto a particular subscriber line. In an ADSL network, the exchange device is called a Digital Subscriber Line Access Multiplexer (DSLAM).

A cable TV network is conceptually similar, though implemented with different hardware. The broadband cable TV network includes many access networks through which subscribers are connected to the network. Subscribers in a particular neighborhood are connected through a common cable to a neighborhood router. Information on a cable network is transmitted using IP addressing, with each subscriber having its own IP address. In this way, each subscriber receives information directed to it as part of a "virtual" subscriber line.

The access portion of a network has traditionally been one of the most difficult parts of the network for a service provider to maintain. A network service provider might provide service to hundreds of thousands of subscribers. Clusters of subscribers will access the network through different access networks. Thus, there are many access networks that must be maintained. Further, the access networks are physically spread out over a wide area, exposing the access networks to significant potential for fault or interference. Furthermore, the geographical dispersion of the access networks also makes it expensive and difficult to identify and locate conditions that might affect service to users of the network.

Herein, a DSL network, more specifically an ADSL network, will be used as an example of a broadband network. However, cable and other types of broadband networks exist and experience problems analogous to those encountered in DSL networks.

Certain telephone line impairments at or near the customer premises require field technicians to be dispatched to the customer premises to make tests to uncover the impairments. Some of these impairments include making accurate measurements of line length and insertion loss, a far end series resistance fault, double ended balance of the line and whether adjacent circuits at the customer premises are radiating noise into the cable which can affect the service of the line.

For example, it is desirable for wires in the line to be balanced. In a balanced line, the resistance, capacitance and inductance of each wire are equal. Imbalances exist if capacitance, inductance or resistance of one of the wires differs from the other. A single ended balance test can be performed at the central office. This is done by transmitting a signal from the central office and making measurements at the central office, i.e., at the near end. However not all fault conditions will be observable from the central office. To perform a double ended balance test, and detect all line impairments, a technician must be present at the customer's premises, i.e. at the far end, to send a required signal to the near end and/or measure a signal from the near end.

It would be desirable and cost affective for a network operator to be able to quickly identify such "far end" service affecting conditions, without dispatching a technician.

The present invention is intended to allow exchange based measurements to identify the presence of telephone line impairments at or near the customer premises which cannot normally be detected from the exchange.

SUMMARY OF THE INVENTION

With the foregoing background in mind, a system and method in accordance with the present invention efficiently detects service affecting conditions in an access network.

In accordance with one aspect of the invention, a system or method comprises identifying service affecting conditions in an access portion of a network through which a plurality of subscribers are connected to an exchange. The access network comprises subscriber lines connected to subscriber modems. The test system comprises a receiver for receiving pilot signals from a modem connected to one of the subscriber lines. A measuring unit is operatively associated with the receiver for measuring electrical characteristics of the received pilot signals. A test controller is operatively associated with the measuring unit and uses the measured electrical characteristics to identify a service affecting condition.

Conventionally, to measure line balance, a common mode signal is applied at a specific frequency at one end of a line. The amount of the signal that has been converted into a differential mode signal is measured. The greater the converted signal the worse the line balance. In accordance with another aspect of the invention, the system and method reverses the above logic by using the customer modem as a differential signal source at the far end of the line and measures the difference in common mode conversion at the central office.

The foregoing is achieved in a network having a modem connected to each subscriber line. Information from the modem is used to identify service affecting conditions on the line. In one embodiment, common mode (leg to ground) measurement and lower frequency ADSL upstream frequency bands are used to allow the far end noise and other conditions to be detected and their affects at higher frequencies to be extrapolated.

DETAILED DESCRIPTION OF THE INVENTION

Figure 1:
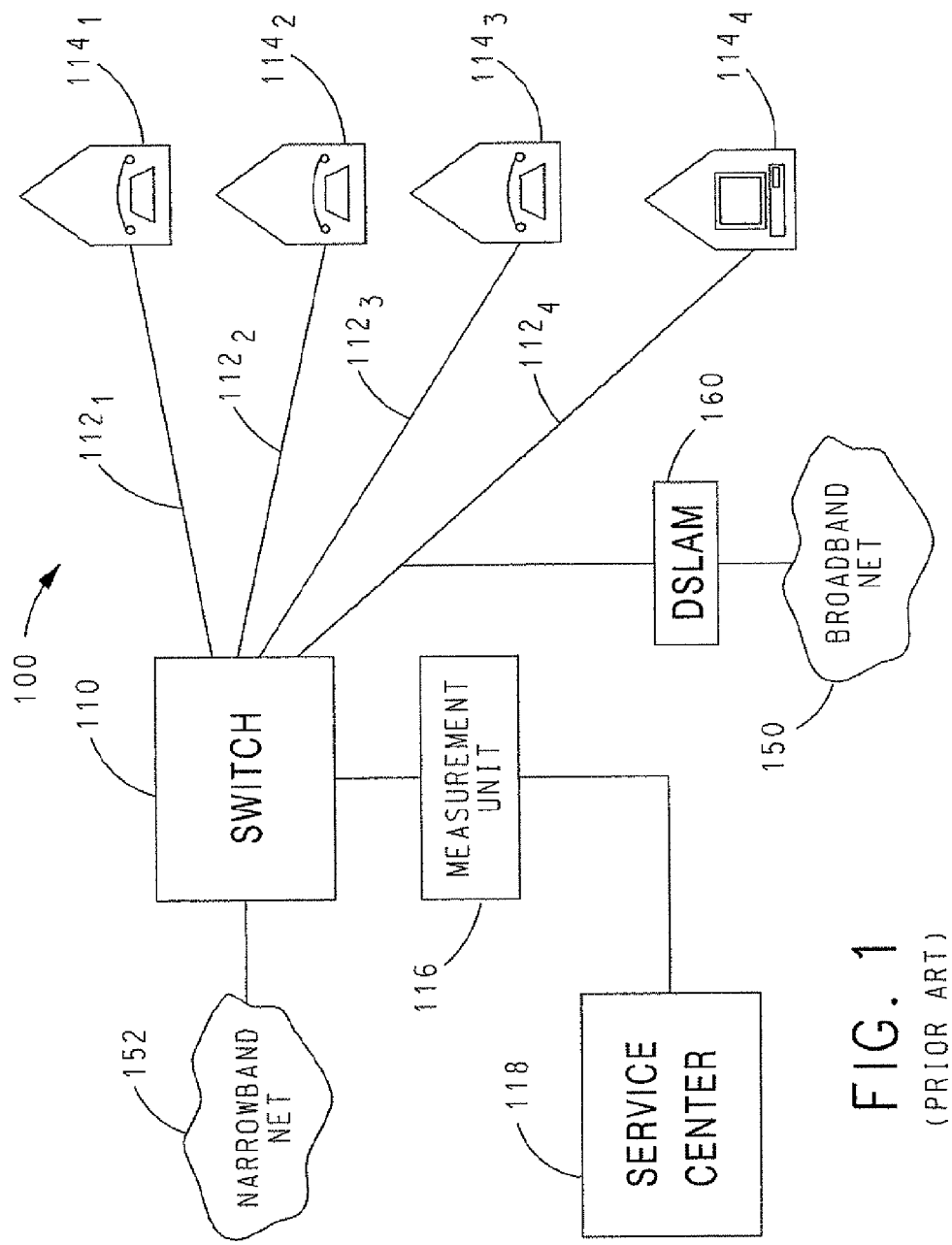
FIG. 1 is a block diagram illustrating an access network.

FIG. 1 illustrates a broadband network 100. In the illustrated example, the broadband network 100 is an ADSL network. The method described herein applies equally to other forms of DSL technology. In an ADSL network, the same physical lines as are used to deliver telephone services are often used for the access network. In FIG. 1, those physical lines of an access network are illustrated as subscriber lines $112_1$, $112_2$, $112_3$ and $112_4$. It will be appreciated that an access network would have many more subscriber lines, but only four are shown for simplicity.

The subscriber lines $112_1$, $112_2$, $112_3$ and $112_4$ connect respective subscriber/customer premises $114_1$, $114_2$, $114_3$ and $114_4$ to a switch 110. In the example of FIG. 1 the first three subscriber premises $114_1$-$114_3$ receive only plain old telephone service (POTS). The fourth subscriber premises $114_4$ is receiving broadband data services.

The switch 110 is located at a central office or exchange and connects to a narrowband network 152. The switch 110 routes a telephone call carried over the narrowband network 152 to an appropriate subscriber line 112. For simplicity of description herein, when one of the subscriber lines or premises are described generically, the subscript is omitted.

The broadband network 100 also includes a measurement unit 116. The measurement unit 116 connects through the switch 110 to any of the subscriber lines $112_1$-$112_4$. As is known in the art, the measurement unit 116 can measure electrical properties on the subscriber lines. An example of a suitable measurement unit is the Celerity® product sold by Tollgrade Communications, Inc. of Cheswick, Pa.

The measurement unit 116 provides data to a service center 118. The service center 118 could be a call center operated by the network operator. Although FIG. 1 shows the service center 118 in a single location, it should be appreciated that the service center 118 could contain many computers distributed over a network. Alternatively, the service center 118 could be implemented as part of another network facility such as the network operations center.

Broadband services are provided to the fourth subscriber premises $114_4$ through the fourth subscriber line $112_4$. Accordingly, the fourth subscriber line $112_4$ is connected at its central section to a broadband network 150. The connection is made through a DSLAM 160.

Figure 2:
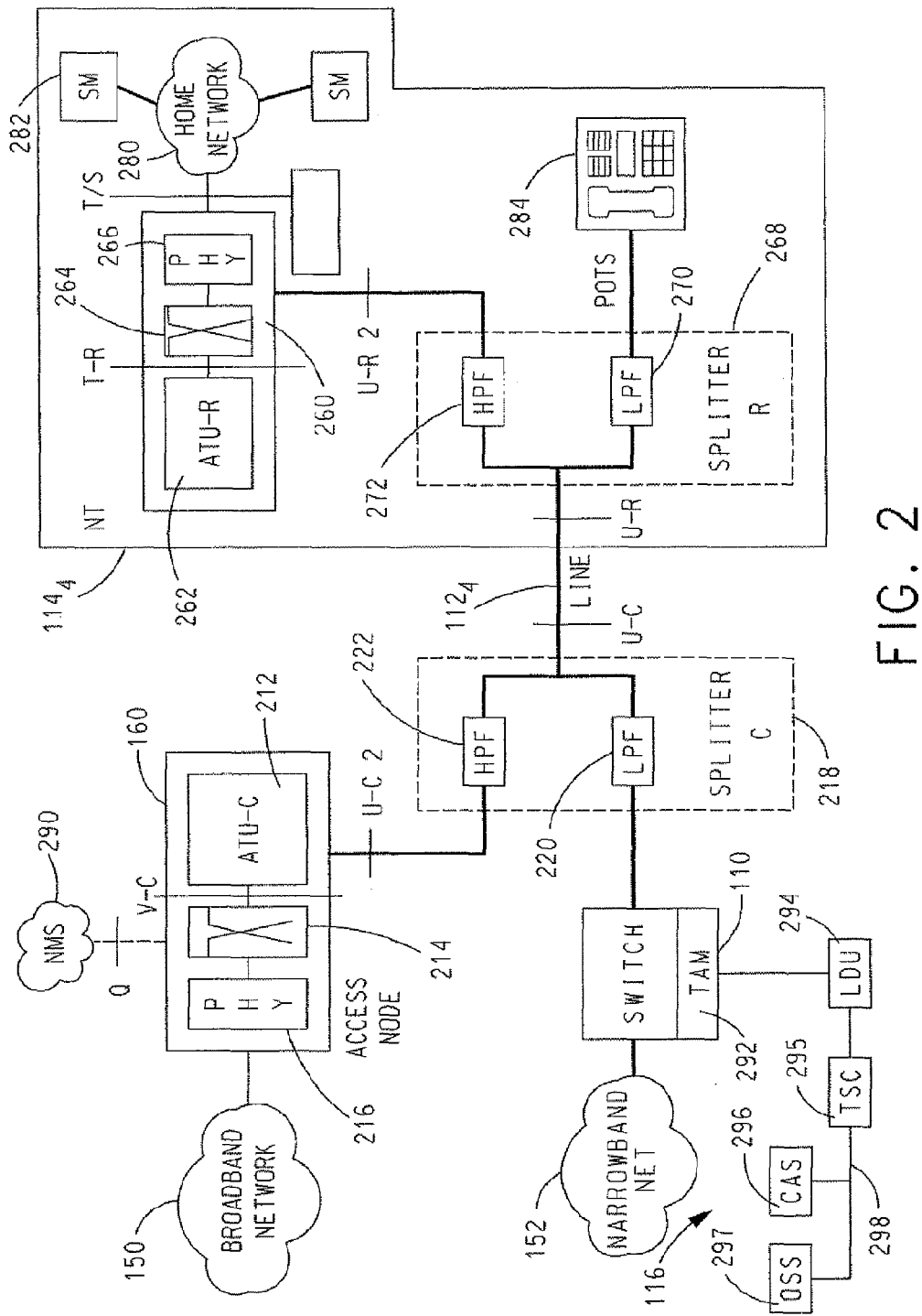
FIG. 2 is a detailed block diagram illustrating a portion of the access network, also known as the DSL Reference Model, of FIG. 1, including test systems at the exchange.

In FIG. 2 additional details of the connections to the fourth subscriber line $112_4$ are shown. FIG. 2 shows that the fourth subscriber premises $114_4$ includes subscriber terminals 282 that transmit and receive digital data over the broadband network 150. In a traditional setup, the subscriber terminals 282 could be personal computers.

The fourth subscriber premises $114_4$ includes a premises DSL splitter 268. The splitter 268 includes a low pass filter 270 that connects to a traditional telephone 284. The splitter 268 also includes a high pass filter 272 that connects to a network termination device 260. The splitter 268 ensures that low frequency signals, such as are used to carry telephone service, are routed to the telephone 284 and higher frequency signals, such as those used to carry broadband data, are routed to the network termination device 260.

The network termination device 260 is sometimes called a modem. It includes a transceiver unit 262, such as an ADSL Terminal Unit-Remote (ATU-R). Herein the term "modem" will be used to generally refer to any device that transmits or receives information to or from the broadband network 100 to establish communication between a subscriber and the broadband network.

The network termination device 260 might also include circuitry to perform dynamic channel allocation, such as a multiplexer 264. For example, an ADSL modem might allocate data between two DSL channels to support dual latency (e.g., fast and interleaved) modes. However, such an element is not necessary to practice the invention.

The network termination device 260 also includes a physical connection 266, here to a home network 280. The specific type of physical connection will depend on the type of devices at the premises connected to the network.

On the central side of the line, there is a corresponding central office splitter 218. The splitter 218 includes a low pass filter 220 and a high pass filter 222. The low pass filter 220 is connected to the switch 110. The low pass filter 220 passes low frequency voice signals between the switch 110 and the fourth subscriber line $112_4$. The high pass filter 222 passes high frequency signals between the DSLAM 160 and the fourth subscriber line $112_4$.

The DSLAM 160 includes a corresponding transceiver 212, such as an ADSL Terminal Unit-Central (ATU-C). It also includes a multiplexing device 214, similar to the multiplexer 264. The DSLAM 160 also includes a physical connection 216 to the broadband network 150.

In operation, broadband information from the broadband network 150 destined for the fourth subscriber premises $114_4$ passes through the DSLAM 160 and is encoded at the transceiver unit 212. This information passes through the fourth subscriber line $112_4$ where it is received by the transceiver unit 262 inside the network termination device 260. The information is then converted into a form where it can be used within the home network 280. Likewise, information from the subscriber terminals 282 is passed through the home network 280 to the transceiver 262. The transceiver 262 puts the information in a form that can be transmitted over the fourth subscriber line $112_4$ to the transceiver unit 212 inside the DSLAM 160. The transceiver unit 212 receives the information and allows the DSLAM 160 to place it in a format that it can be transmitted over the broadband network 150.

When information is provided from the broadband network 150 through the fourth subscriber line $112_4$ to subscriber terminals 282, the broadband network 100 is said to be providing data in a downstream direction. Conversely when information is generated at subscriber terminals 282 and passes through the fourth subscriber line $112_4$ to the DSLAM 160, the broadband network 100 is said to be operating in the upstream direction. In an ADSL network, the rate at which information is passed in the upstream direction is lower than the rate at which information is passed in the downstream direction.

FIG. 2 shows that the DSLAM 160 is connected to a network management system 290. The network management system 290 provides commands to the DSLAM 160 to configure it for proper operation within the network. In addition, the DSLAM 160 captures data about performance of the access portion of the broadband network 100. This information can be passed to the network management system 290.

As is conventional, an active CPE (Customer Premise Equipment) ADSL modem with the DSLAM 160 disconnected will produce three differential pilot tone signals at approx 30, 70 & 104 kHz, each signal being at approx-2 dBm. These pilot signals are used as part of the standard "handshake" between the network termination device 260, e.g., a CPE modem or an ASDL modem, and the DSLAM 160.

The system and method of the present invention allows exchange based measurements to identify the presence of telephone line impairments at or near the customer premises, e.g., the fourth subscriber premises 114$_4$, which cannot normally be detected from the exchange, i.e., the switch 110. The technique uses the customer's network termination device 260 as a signal source to allow the following conditions to be determined:

1. That the ADSL modem pilot signal levels (three frequencies) are all measured for an insertion loss value and are compared to what would be expected from a line of that length and loss. Accurate length and insertion loss data of the expected parameters will be generated by the Celerity® system for comparison with these values. These values are not normally available from DSL equipment and hence such a correlation could not previously be made.
2. Where the levels are below those expected and there are no other affecting faults, identified by the Celerity® system, a far end series resistance fault value will be inferred.
3. The double ended balance of the line will be estimated using the common mode conversion data for each of the pilot frequencies, providing an indication that would otherwise require a pair of technicians to perform a field test. While the Celerity® application currently makes a single ended (exchange based) balance measurement, this often cannot take account of conditions at or near the customer end of the line and hence cannot indicate the far end balance, detection of far end line impairments and potential impact of adjacent noise on the line under test.
4. Whether the adjacent circuits ingress noise as a source of radiating interference into the cable bundle and hence capable of affecting the service of the line under test (and other lines in the cable).

In other forms of DSL, the pilot frequencies may be different from ADSL pilots identified above. The present invention may be applied to other DSL techniques without loss of generality.

Conventionally, to measure balance, a common mode signal is applied at a specific frequency at one end of a line. The amount of the signal that has been converted into a differential mode signal is measured. The greater the converted signal the worse the line balance. In accordance with the invention, the customer modem functions as a differential signal source at the far end of the line and the system measures the difference in common mode conversion at the central office.

The present invention enables the above conditions to be measured from the exchange rather than requiring field technicians to be dispatched to the customer premises to make such tests. Particularly, the present invention takes advantage of the standard pilot tones transmitted by a CPE modem as a signal source to perform the tests at the near end, i.e., the central office. This eliminates the requirement to dispatch a technician to the customer's site. The availability of this data and analysis will result in a more efficient repair process.

While the first listed condition is not unique, i.e., the detection of the differential pilot tones, and if the line will synchronize, some of the information related to the cable noise may be available via the exchange modem MIB (Management Information Base). Techniques using differential (A-B) noise tests can be performed from the central office, however they are not sensitive to far end noise. The uniqueness of the disclosed technique comes from the use of the common mode (leg to ground) measurements and the use of the lower frequency ADSL upstream frequency band as a test signal source to allow the far end noise and other conditions to be detected and their affects at higher frequencies to be extrapolated.

From the above measurements and the existing Celerity® tests, the combined analysis will allow fault detection, analysis and repair dispatches to be made that will now include impairments at the customer end of the line that otherwise would not be detectable from exchange based testing, hence providing a more cost effective repair process.

Referring to FIG. 2, the measurement unit 116 in accordance with the invention is illustrated in greater detail. A Test Access Matrix (TAM) 292 is operatively associated with the switch 110. A loop diagnostic unit (LDU) 294 is connected to the TAM 292. A Test System Controller (TSC) 295, a Central Applications Server (CAS) 296 and an operation support system (OSS) 297 are connected to a Local Area Network (LAN) 298. The TSC 295 is connected to the LDU 294. The LDU 294 comprises a measurement component, while the TSC 295, CAS 296 and OSS 297 comprise server platform components. As is apparent, each block represents a particular function which could be implemented in various hardware configurations.

The TAM 292 is an automated remote test access tool for DSL and POTS loop management. The LDU 294 is an advanced DSP-based test head designed to meet the requirements of central office and exchange installations, providing both copper line test and wideband services test capability. The LDU 294 helps the network operator reduce the costs of maintaining and provisioning voice and broadband data services over a complex copper plant. The TSC 295 provides the centralized processing of diagnostics and test results. The CAS 296 serves as the enterprise server for the line test system. Large line test system deployments require multiple TSCs 295 in the network, usually supporting many millions of lines. The CAS 296 provides the centralization of line test system management capabilities for all TSCs 295 in the network. Some of the system management functions include automated test redirection to a backup TSC in response to a TSC outage, usage monitoring and statistical analysis of network-wide test transactions and data storage for test results across the network. The CAS 296 provides users with a graphical interface to the test platforms. Users connect to a web page using a standard browser, log in with a password and are able to execute test sequences and retrieve results of previous transactions. Multiple local languages are supported.

The OSS 297 is operable to request that a test be performed. The test may be initiated responsive to a customer calling in with a problem and the request being entered using a Call Center Web User Interface, or the like. Alternatively, the CAS 296 can initiate the test.

In accordance with the invention, tests have been developed to detect far end CPE double ended balance due to mode conversion—primarily for series resistance (Series R) faults, and cable and line noise as an interferer source.

For cable noise testing, common mode high frequency noise would be of little use as the near end downstream signal is so strong that, even with well-balanced neighbor pairs, significant common mode noise would be present. However, upstream frequencies, used at the far end, are much less attenuated for common mode measurements and the level of noise/crosstalk will be less prone to interference from adjacent balanced signals. This provides data to determine whether there were badly-balanced neighbor pairs that were radiating noise into the cable. While this only measures low frequency, the downstream direction would also be affected. Hence if the victim pair was unbalanced it would be subject to noise interference in both directions of transmission.

By using combinations of measurements and deductive logic the system can detect:
  Poor balance measured from the CO and confirmed by the ATU-R pilots mode conversion balance technique,
  Series R into the network out to the point where it is affecting the balance,
  Series R in or near the premises and is of sufficient value to affect service, and
  Noise in the cable due to adjacent disturbers.

This system and method enables one to detect that there are far end Series R or premises internal wiring problems and cable noise sources that cannot currently be seen from the central office. Being able to determine the level of far end noise allows the degree of interference present in that cable and hence indicates that a number of circuits are affected (note that typically a single faulty pair in the cable will not be affected by adjacent DSL noise—however it is exposed to external noise).

Figure 3:
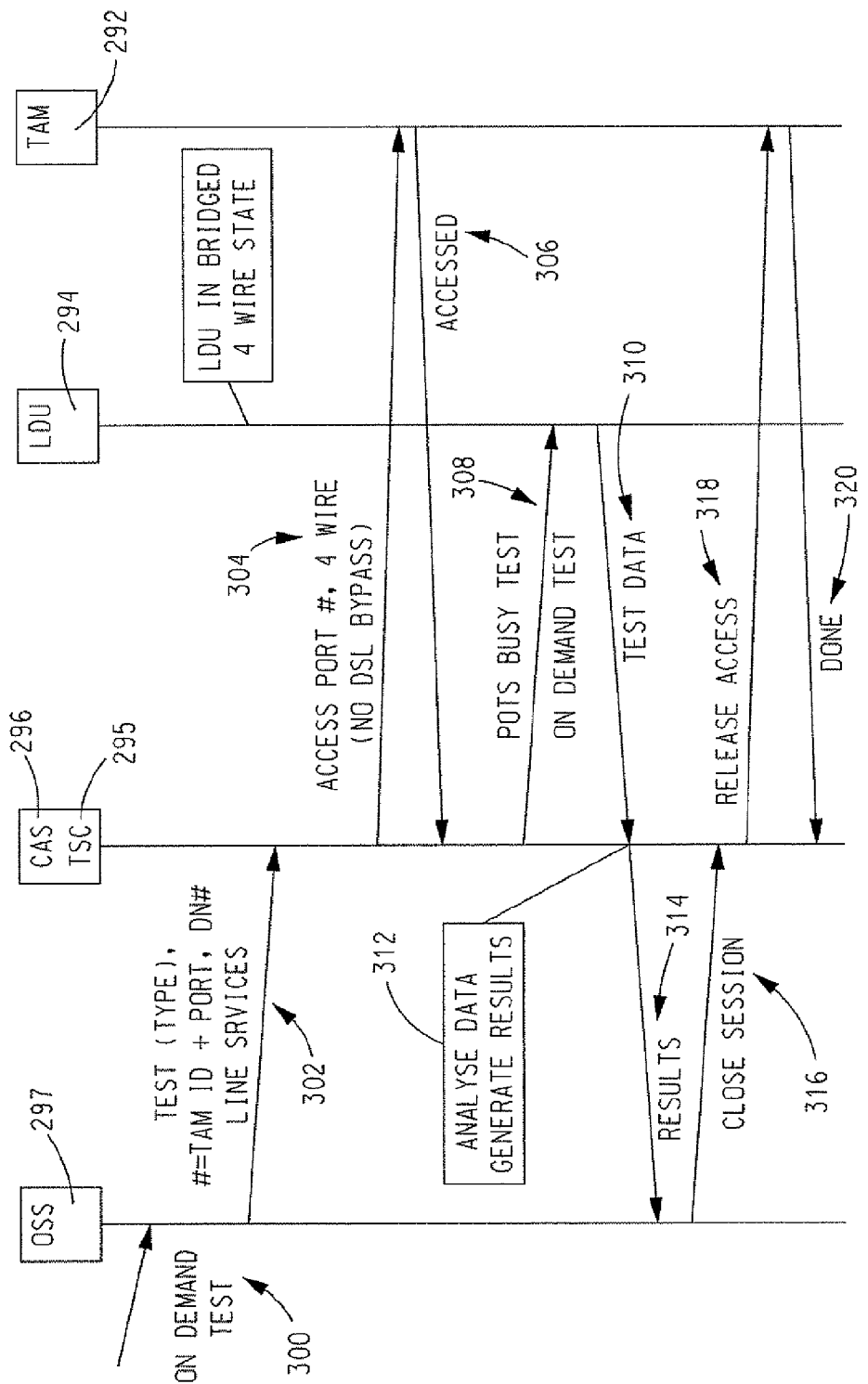
FIG. 3 is a flow chart illustrating the method employed in one embodiment of the present invention.

FIG. 3 comprises a flow diagram illustrating the method for making line measurements from the central office measurement unit 116 in accordance with the invention. At a step 300, a request for an on-demand test is received at the OSS 297. This request may be in response to a customer calling to indicate that a problem exists. At a step 302, a request for a test is sent from the OSS 297 to the TSC 295. The request includes the test type, indicia identifying the TAM 292 ID and port and the line number for services. Alternatively, the CAS 296 could send the test request to the TSC 295. At a step 304, the TSC 295 sends a message to the TAM 292. The message requests a connection of the line to the LDU 294 by indicating the access port number, 4 wire and no DSL bypass. Responsive thereto, the TAM 292 accesses the port and returns a message to the TSC 295 at a step 306. At a step 308, the TSC 295 requests the LDU 294 to run tests, including a POTS busy test and the demand test. The demand test includes a combination of above listed Celerity® measurements for identifying the far end impairments. After the LDU 294 performs the far end tests, as described above, the LDU 294 sends the test results to the TSC 295 at a step 310. The TSC 295 analyzes the test results at a step 312 and forwards the results to the OSS 297 at a step 314 to be provided to the customer. The test session is closed at a step 316 and the TSC 295 sends a release access message to the TAM 292 at a step 318. The TAM 292 disconnects the line and returns a done message at a block 320 to the TSC 295.

Thus, a system in accordance with the invention uses combinations of measurements and deductive logic. The system can detect: poor balance measured from the Central Office and confirmed by the transceiver unit's pilots mode conversion; imbalanced series resistance fault into the network out to the point where it is affecting the balance; imbalanced series resistance fault in or near the premises and is of sufficient value to affect service; and noise in the cable due to adjacent disturbers.

The invention was described in connection with a DSL network. The process described herein is not limited to use in such networks. For example, cable networks also include modems in central locations in an access network that communicate with subscribers. These modems also include interfaces for providing network management information.

Having thus described several aspects of at least one embodiment of this invention, it is to be appreciated various alterations, modifications and improvements will readily occur to those skilled in the art. Such alterations, modifications and improvements are intended to be part of this disclosure, and are intended to be within the spirit and scope of the invention.

The present invention has been described with respect to flowcharts and block diagrams. It will be understood that each element of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

The invention claimed is:

1. A method of identifying service affecting conditions in an access portion of a network through which a plurality of subscribers are connected to an exchange, the access network comprising subscriber lines connected to subscriber modems, the method comprising:
  receiving pilot signals from a customer premise equipment (CPE) modem connected to one of the subscriber lines when the CPE modem is not communicating with a Digital Subscriber Line Access Multiplex (DSLAM);
  measuring electrical characteristics of the received pilot signals; and
  using the measured electrical characteristics to identify a service affecting condition.

2. The method of claim 1 wherein the subscriber line comprises a telephone line carrying DSL service.

3. The method of claim 1 wherein the subscriber line comprises a telephone line carrying ADSL service.

4. The method of claim 3 wherein the received pilot signals comprise tone signals at about 30, 70 or 104 kHz.

5. The method of claim 1 wherein the subscriber line comprises a telephone line carrying ADSL2, ADSL2plus, VDSL1 or VDSL2 service.

6. The method of claim 1 wherein the measured electrical characteristics comprise line insertion loss and common mode conversion ratio.

7. The method of claim 6 wherein using the measured electrical characteristics to identify a service affecting condition comprises using the CPE modem as a differential signal source and measuring common mode conversion differences to determine an imbalance in the line and common mode noise levels and estimating impact on service using the balance and noise levels.

8. The method of claim 1 wherein the identified service affecting conditions are selected from among line insertion loss, series resistance fault, double ended balance of the line and radiated noise due to faulty neighboring pairs.

9. The method of claim 1 wherein the modem pilot signals comprise differential mode signals and measuring electrical characteristics of the received pilot signals comprises measuring common mode of each wire of the subscriber line.

10. The method of claim 1 further comprising receiving a request from a subscriber for testing a subscriber line for a service affecting condition.

11. The method of claim 1 further comprising reporting results of identifying a service affecting condition.

12. A system for identifying service affecting conditions in an access portion of a network through which a plurality of subscribers are connected to an exchange, the access network comprising subscriber lines connected to subscriber modems, the system comprising:
   a receiver for receiving pilot signals from a customer premise equipment (CPE) modem connected to one of the subscriber lines when the CPE modem is not communicating with a Digital Subscriber Line Access Multiplex (DSLAM);
   a measuring unit operatively associated with the receiver for measuring electrical characteristics of the received pilot signals; and
   a controller operatively associated with the measuring unit using the measured electrical characteristics to identify a service affecting condition.

13. The system of claim 12 wherein the subscriber line comprises a telephone line carrying ADSL service and the receiver receives ADSL pilot signals.

14. The system of claim 13 wherein the received ADSL pilot signals comprise tone signals at about 30, 70 or 104 kHz.

15. The system of claim 12 wherein the subscriber line comprises a telephone line carrying xDSL service and the receiver receives xDSL pilot signals.

16. The system of claim 12 wherein the measuring unit measures line insertion loss and common mode conversion.

17. The system of claim 16 wherein the controller uses common mode conversion to determine an imbalance in the line and common mode noise levels and estimates impact on service using the balance and noise levels.

18. The system of claim 12 wherein the controller identifies service affecting conditions selected from among line insertion loss, series resistance fault, double ended balance of the line and radiated noise from faulty neighboring pairs.

19. The system of claim 12 wherein the subscriber modem pilot signals comprise differential mode signals and the measuring unit measures common mode of each wire of the subscriber line.

20. The system of claim 12 further comprising a support system communicating with the controller for requesting a test to identify service affecting conditions and receiving results of the requested test from the controller.

21. The system of claim 20 further comprising a local area network connecting the controller to the support system.

22. The system of claim 12 further comprising a test access matrix for selectively connecting the one of the subscriber lines to the receiver.

* * * * *